INVENTORS
WILLIAM C. CLEMENTS
WILLIAM BOOTZ

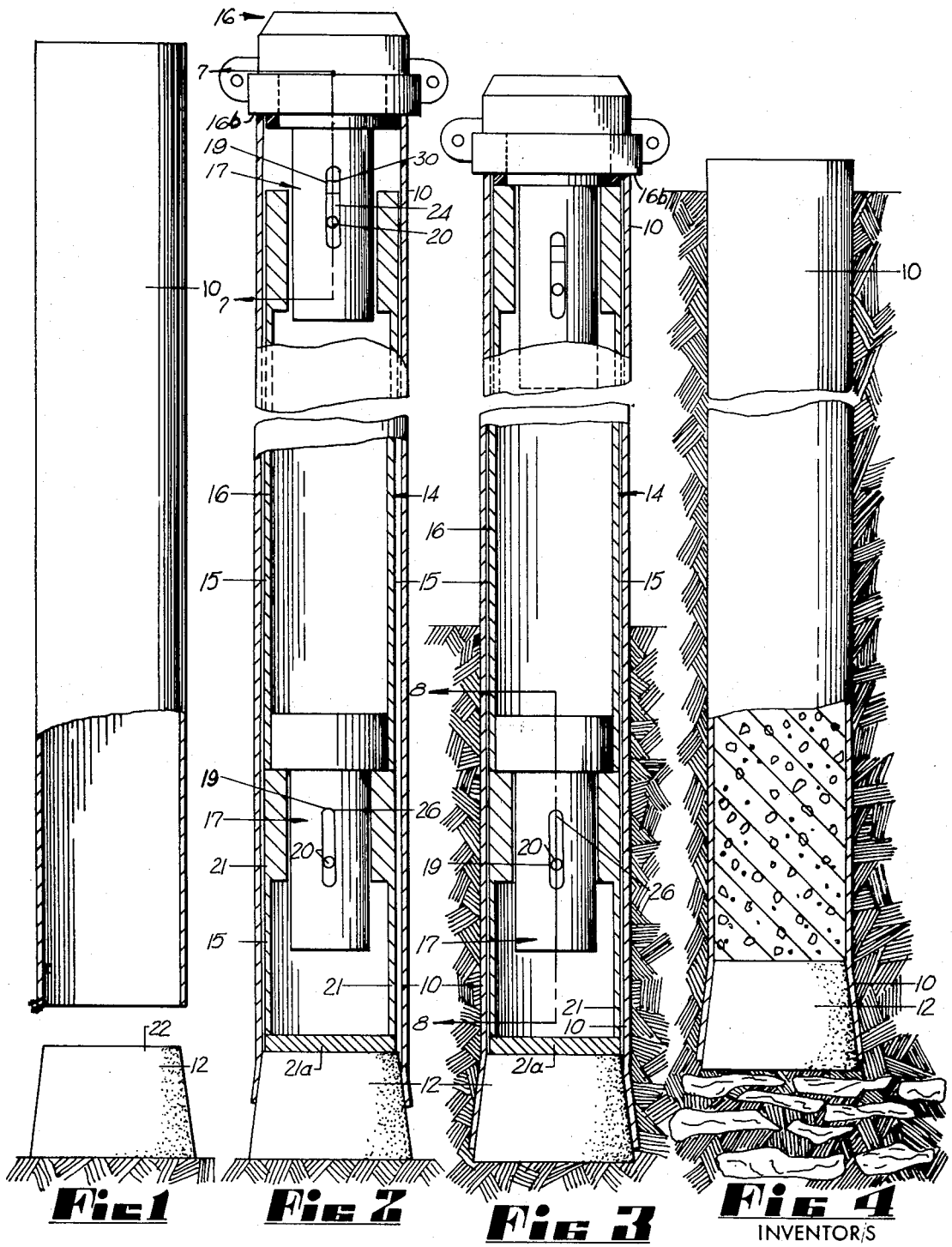

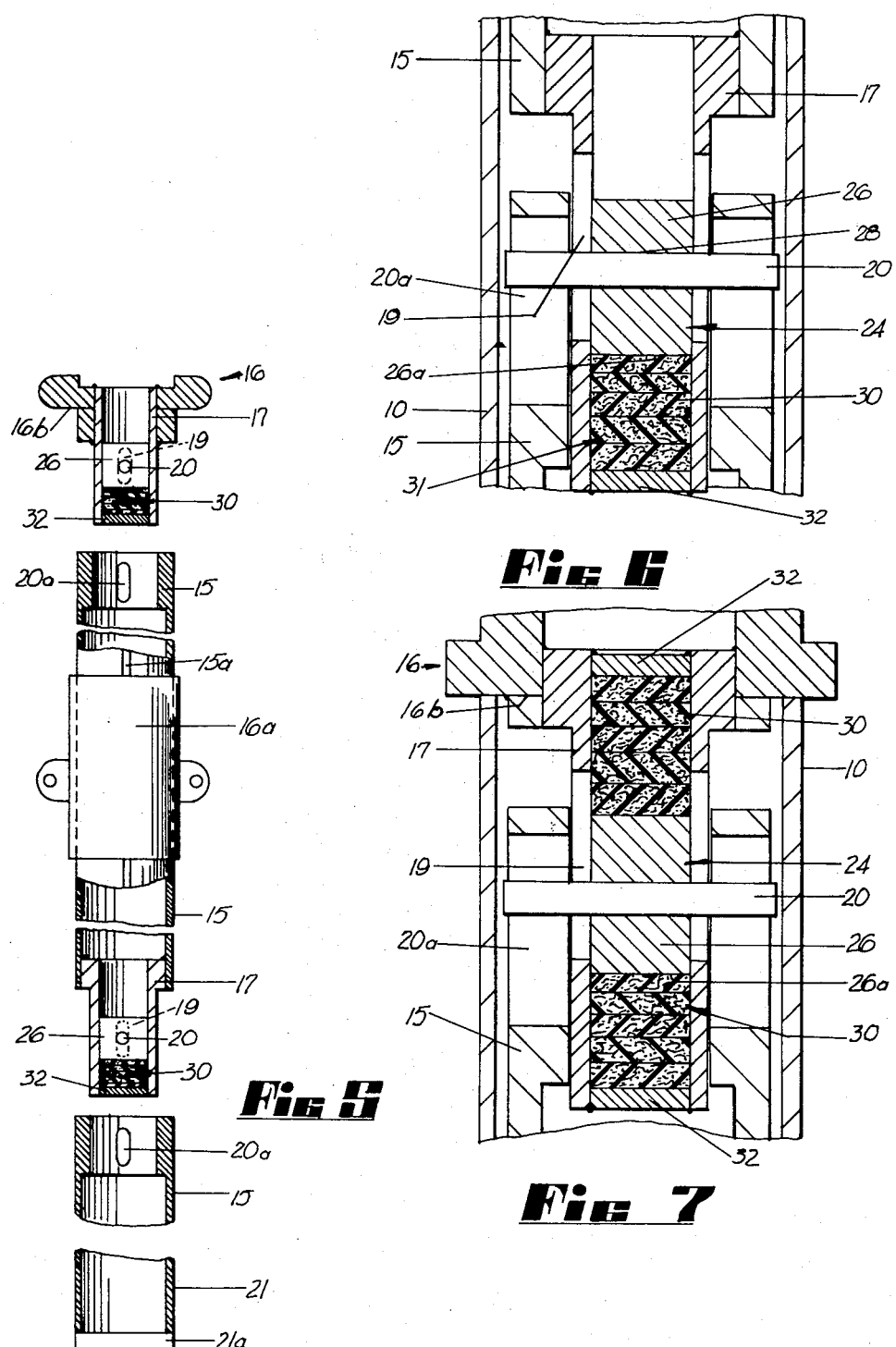

BY *Melville, Strasser, Foster and Hoffman*
ATTORNEYS

> 3,714,787
> ENERGY ABSORBING DEVICE FOR THE CONNECTIONS OF A SEGMENTED DRIVE CORE
> William C. Clements and William Bootz, Middletown, Ohio, assignors to Armco Steel Corporation, Middletown, Ohio
> Filed May 3, 1971, Ser. No. 139,365
> Int. Cl. E02d 7/30, 5/34
> U.S. Cl. 61—53.7      10 Claims

ABSTRACT OF THE DISCLOSURE

An energy absorbing device for the connections of a segmented drive core to decelerate each lower segment by absorbing the drive core inertia and downward momentum of such lower segments.

BACKGROUND OF THE INVENTION

(1) Field of the invention

This invention relates to achieving stable building foundations through piles which are formed by driving a steel shell into the ground with a drive core, removing the drive core, and then filling the shell with concrete, and in particular, to an improved drive core or mandrel for driving thin walled shell into the ground.

(2) Description of the prior art

It is well known that if one piece mandrels, wherein the head and stem are welded together, are used to drive core drive piles, employing an adjustable closure piece, such as a concrete or steel tapered plug, gasketed boot, etc., initial blows on the mandrel head before the stem of the mandrel engages the top of the closure cause high intensity tensile stress waves in the mandrel stem which will cause fatigue failure, weld cracks, and other damage with continued use. These problems have been successfully solved by use of the segmented drive core disclosed in U.S. Letters Patent No. 3,482,409, in the name of William C. Clements, which comprises at least two tubular segments captively joined in telescopic fashion with a sliding fit such that each segment may move from a non-load transmitting fit to a load transmitting fit. However, it has since been found that lower segments of the drive core are apt to either accelerate the closure plug out of the pile or cause extensive damage to splice pins and splice pin bearing holes in the drive core from sudden deceleration. This happens when the natural retarding forces of the lower drive core segments, i.e., closure plug friction plus pile tip soil resistance, permit the segments to move an amount greater than the slot length.

SUMMARY OF THE INVENTION

The present invention overcomes the aforementioned problems by providing an energy absorbing device for the pin connections of a segmented drive core. In practice, the energy absorbing devices are positioned within one or more of the sleeves joining two segments, or the drive head and a segment, of the drive core to decelerate the lower ones of the segments by absorbing the drive core inertia and permitting downward movement of the lower segments within selected limits of travel within the slots in the sleeves.

BRIEF DESCRIPTION OF THE DRAWING

FIG. 1 is a broken-away side elevation showing a thin walled shell and a tapered closure plug which form the parts of a pile to be driven by the improved drive core of the present invention.

FIG. 2 is a broken-away side elevation showing a pile to be driven after the improved drive core of the present invention has been placed therein.

FIG. 3 is a broken-away side elevation of a pile after it has been partially driven so that the closure plug is embedded within the lower end of the thin walled shell.

FIG. 4 is a broken-away side elevation showing a pile driven to the desired depth and filled with concrete.

FIG. 5 is an exploded cross-sectional view of the improved drive core according to the present invention.

FIG. 6 is an enlarged cross-sectional view showing one embodiment of the energy absorbing device for the connection of a segmented drive core according to the present invention.

FIG. 7 is an enlarged cross-sectional view taken on the line 7—7 of FIG. 2 when the segments of the drive core are in a non-load transmitting fit.

DESCRIPTION OF THE PREFERRED EMBODIMENTS

Figure 8:
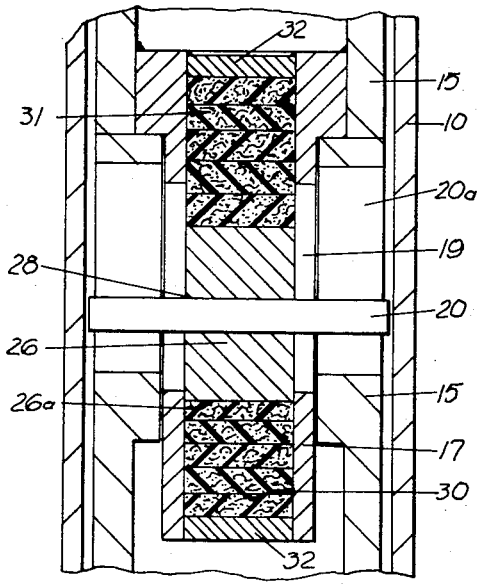
FIG. 8 is an enlarged cross-sectional view taken on the line 8—8 of FIG. 3 when the segments of the drive core are in a load transmitting fit.

The present invention provides an improved drive core for placing thin walled shell in the ground to form a pile. It will be understood that after the shell has been placed in the ground, it will be filled with concrete, as shown in FIG. 4, to complete the formation of the pile.

FIG. 1 discloses the elements of a pile which will be driven by the improved drive core of the present invention. A shell 10 of a length sufficient to form the desired pile is disposed over a tapered closure plug 12. The plug 12 is preferably of precast concrete, but it may be of metal or other suitable material so long as its tapered sides expand or compress the lower end of the shell within a specified range, as explained in U.S. Letters Patent No. 3,482,409, or U.S. Letters Patent No. 3,543,524.

FIG. 5 shows an exploded cross-sectional view of a drive core 14. The drive core 14 comprises tubular segments 15 captively joined in telescopic fashion with a sliding fit such that each segment may move from a non-load transmitting fit to a load transmitting fit. A sleeve 17 is welded or otherwise secured in the lower end of each segment 15. A slot 19 in each sleeve 17 provides an aperture for the passage of a pin 20, located through the slots 20a in the top of each segment 15, to captively retain the segments 15 together. It will be clear that the segments 15 are joined in telescopic fashion and that they may slide with respect to the length of the slot 20a. When the ends of the segments 15 are in contact with each other, they are in a load transmitting fit. However, when the ends of the segments 15 are not in contact with each other the segments 15 are in a non-load transmitting fit.

The drive core head 16, being the uppermost segment of the drive core 14, transmits force from the driving cap to the pile. Ordinarily, the drive core head (not shown) is joined in telescopic fashion with the uppermost segment 15 of the drive core 14 in the same manner as the segments 15 are joined together.

An adjusting sleeve 16a aids in varying the effective length of the drive core 14 so as to accommodate shells of various lengths. The adjusting sleeve 16a may be slipped over or clamped on the uppermost segment 15 of the drive core 14 so that it rests against the shoulder 16b of the drive head 16.

Intermediate segments 15 may be provided to accommodate longer piles than provided for with only a two part drive core.

Joined to the lowermost segment of the drive core is a standard bottom 21. The standard bottom 21 is joined to the lowermost segment 15 of the drive core in the same manner as the segments join together. In operation, it is the standard bottom 21 which contacts the driving face 22 of the closure plug 12.

As explained in U.S. Letters Patent No. 3,482,409, if the drive core 14 is to drive stepped-down diameter shell, stepped-down diameter segments may be utilized.

The drive head 16, the segments 15 and the standard bottom 21 are preferably provided with longitudinally extending spacer ribs 15a. The spacer ribs 15a are spaced equally around the periphery of the segments 15 and the standard bottom 21, and aid in positioning the drive core 14 within the shell 10, in minimizing the tendency of the shell 10 to sweep out of alignment, and in minimizing friction between the drive core 14 and the inside of the shell 10.

Turning now to FIGS. 6–8, it will be seen that the energy absorbing device 24, which is positioned within one or more of the sleeves 17 joining the segments 15 of the drive core 14 or the drive head 16 and the uppermost segment 15 of the drive core 14, includes a cylindrical plug 26 substantially the diameter of the interior barrel of the sleeve 17 positioned for movement therein. The plug 26 is provided with an aperture 28 therethrough for receipt of a pin 20 when it is placed through the slots 20a and the slots 19, which are in the segment 15 and the sleeve 17, respectively. Shock absorbing means 30 are positioned in the interior barrel of the sleeve 17, at least in the lower portion thereof, such that the lower end 26a of the plug 26 rests thereon when the pin 20 is in the slots 19.

The shock absorbing means 30 shown in FIGS. 6–8 may comprise any suitable preformed fabric or rubber or synthetic rubber shock dampening-vibration isolation material such as rubber impregnated fabric pads or synthetic rubber shock absorbing pads 31. As will be more fully explained hereinafter in connection with FIGS. 9 and 10, in lieu of pads, the shock absorbing means 30 may comprise a spring, a hydraulic device, or any other mechanical device that will decelerate the lower drive core segments over a selected distance and within safe stress limits in the drive core.

The shock absorbing means 30 is retained in the interior barrel of the sleeve 17 by any suitable method, such as the use of plates 32 which are welded or otherwise secured to the interior barrel.

The operation of the energy absorbing device 24 of the present invention will be more clearly understood when explained in connection with the method of driving a shell 10 and closure plug 12 as shown in FIGS. 1–4.

In FIG. 1, the open end of a shell 10 is disposed over a closure plug 12 which has been placed on the ground at the location where the pile is to be driven. A segment 15 of the drive core 14, having thereon a standard bottom 21 and a drive head 16, which includes a driving cap 19a, is then disposed within the thin walled shell 10, such that the drive head 16 receives the butt of the shell 10 and the standard bottom 21 and the intermediate segments 15 rest in a non-load transmitting position against the working face 22 of the closure plug 12. The fact that the standard bottom 21 and the intermediate segments 15 of the drive core 14 do not hang free during the initial stages of driving is important because it precludes high tensile stresses in the uppermost part of the drive core 14 which result from the acceleration due to the driving means plus the restraint offered to the drive head 16 by the shell 10.

As can be seen from FIGS. 2 and 7, the shock absorbing means 30, such as the pads 31, are positioned so that they maintain the pin 20 generally centered in the slots 19 of the sleeves 17. The pin 20 will be located near the top of the slot 20a in the segment 15 but not in contact therewith. The standard bottom 21 and the segment 15 are resting on the top 22 of the closure plug 12 so that there is no weight on the pin 20. The only time the lower portions of a drive core 14 exert a load on the connecting pins 20 is when the drive core 14 is suspended on the leads of the pile driver or when the distance from the top of the shell 10 to the top 22 of the plug 12 exceeds the extended length of the drive core 14. Accordingly, the energy absorbing device 24 is not stressed during normal driving of the pile. This is important, because driving energy is not absorbed and the shock absorbing means 30, such as the pads 31 and the like, are not rapidly destroyed by driving.

As the driving means (not shown) applies driving force to the head 16 of the drive core 14 and the shell 10 is pressed down to drive the closure plug 12 into the ground, the resistance of the closure plug 12 to driving causes the lower end of the shell 10 to further telescope over the tapered closure plug 12. When the closure plug 12 is embedded within the lower end of the shell 10, it pushes the standard bottom 21 upwardly against the segment 15 and the segment 15 upwardly against the segment 15 and the segment 15 upwardly against the drive head 16 of the drive core 14, from a non-load transmitting fit to a load transmitting fit. The driving means now furnishes driving force through the head 16 simultaneously and directly to the shell 10 and through the drive core 14 to the closure plug 12 until the lower end of the shell 10 reaches a desired depth and/or bearing, as shown in FIG. 4.

If easy driving is encountered, there is a tendency for the lowermost segments or standard bottom 21 of the drive core 14 to be accelerated sufficiently so that the closure plug 12 is driven free of the shell 10. However, before this can occure the energy absorbing device 24 causes a gradual deceleration of the lowermost segments or standard bottom 21 of the drive core by absorbing drive core inertia and downward movement of the lowermost segments or standard bottom 21 within selected limits of travel within its respective slots 19. This is so because the pin 20, upon reaching the limit of travel afforded by the slots 20a in the lowermost segments or standard bottom 21 applies a force through the cylindrical plug 26 to the pads 31 of the energy absorbing device 24.

It should be pointed out that a pile of any desired length may be driven by the improved drive core of the present invention. All that is necessary is that after the butt in a particular shell 10 is driven substantially level with the ground, another shell 10 is placed atop thereof, and the shells are joined together. A further segment 15 of the drive core 14 is then captively joined by a pin through the slots 19 to the preceding segment 15 of the drive core 14. It will also be understood that piles of any length may be driven by simply formulating a drive core 14 of the proper length from the increments available from the drive head 16, the adjusting sleeve 16a, the segments 15 and the standard bottom 21.

Figure 9:
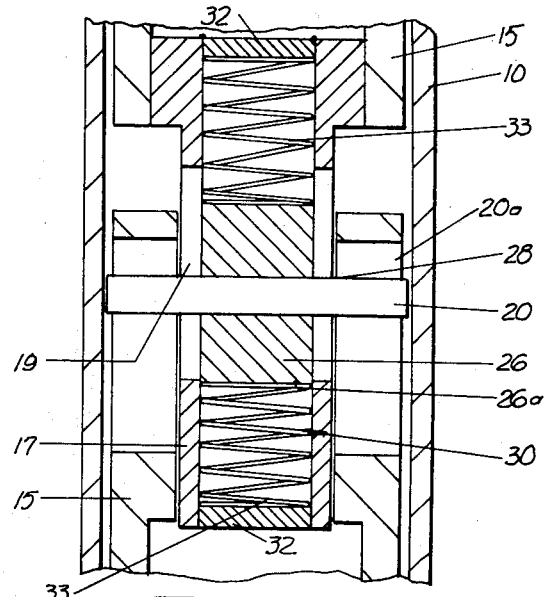
FIG. 9 is an enlarged cross-sectional view similar to FIG. 6, wherein the shock absorbing means of the energy absorbing device comprise springs.
Figure 10:
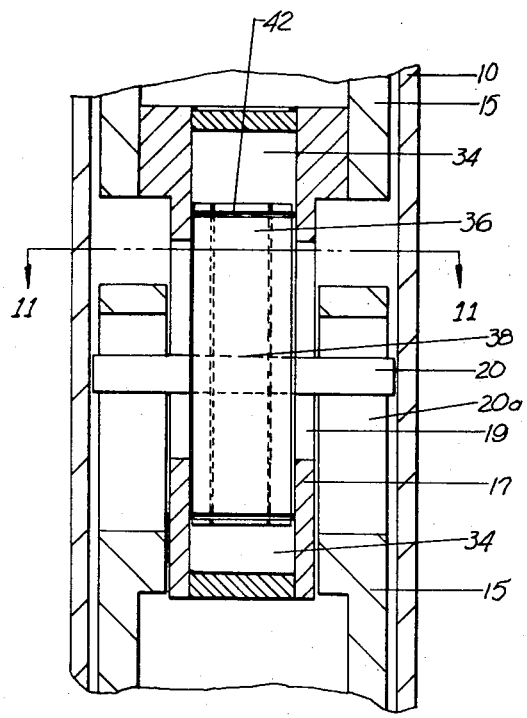
FIG. 10 is an enlarged cross-sectional view, also similar to FIG. 6, wherein the energy absorbing device for the connections of a segmented drive core according to the present invention comprises a hydraulic damper.
Figure 11:
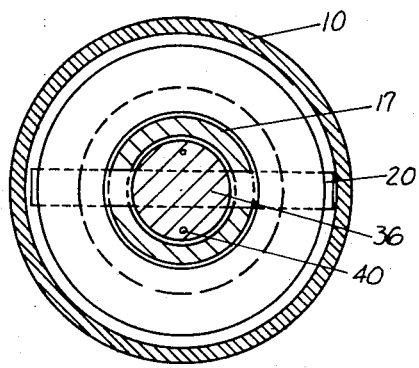
FIG. 11 is a cross-sectional view taken on the line 11—11 of FIG. 10.

Turning now to FIGS. 9 and 10, it will be seen that the energy absorbing device 24 may comprise a spring, a hydraulic device, or any other mechanical device that will decelerate the lower drive core segments over a selected distance and within safe stress limits in the drive core. For example, in FIG. 9, in lieu of the pads 31, the shock absorbing means 30 comprises at least one spring 33, positioned in the interior barrel of the sleeve, at least in the lower portion thereof, such that the lower end 26a of the cylindrical plug 26 rest thereupon. In like manner, as shown in FIG. 10, the energy absorbing device 24 may comprise a suitable hydraulic damper, which includes a hydraulic reservoir 34 at each end of the piston 36 in the interior barrel of the sleeve. A cylindrical piston 36, having an aperture 38 therethrough for receipt of the pin 20 and at least one longitudinally extending internal or peripheral port 40, is positioned such that each end of the port 40 communicates with the hydraulic fluid in the reservoirs 34. Suitable seal means 42 around the piston 36, and if applicable, associated with any peripheral port 40, maintain the hydraulic fluid within the reservoirs 34.

While certain perferred embodiments of the invention have been specifically illustrated and described, it is understood that the invention is not limited thereto, as many variations will be apparent to those skilled in the art, and the invention is to be given its broadest interpretation within the terms of the following claims.

The embodiments of the invention in which an exclusive property or privilege is claimed are defined as follows:

1. In a drive core for driving thin walled shell, the lower end of said shell being disposed over a closure plug on the ground at the location where each shell is to be driven, said drive core having a drive head and one or more tubular segments captively joined to said drive head in telescopic fashion with a sliding fit, a splice pin located within the upper end of each said segment and a sleeve secured in the lower end of all but the lowermost one of said segments and in the lower end of said drive head, each said sleeve having a slot therein for receipt of said splice pin, whereby said drive head and said segments may move with respect to each other from a non-load transmitting fit to a load transmitting fit, said drive head communicating with driving means and including an annular shoulder which contacts the butt of said shell, whereby as driving pressure is applied to said drive core by said driving means, said thin walled shell is pressed down to drive said closure plug into the ground, the resistance of said plug to driving causing the lower end of said shell to telescope with said closure plug so that said closure plug pushes said lowermost segment of said drive core from a non-load transmitting fit to a load transmitting fit and said drive core thus supplies driving pressure simultaneously and directly to both said shell and said closure plug until such time as the lower end of said shell and said closure plug reach a desired depth, the improvement, in combination therewith, which comprises an energy absorbing device positioned within at least one of said sleeves to decelerate the lower ones of said segments by absorbing the drive core inertia and downward movement of said lower segments within selected limits of travel within said slots, said energy absorbing device comprising a cylindrical plug substantially the diameter of the interior barrel of said sleeve positioned for slidable movement therein, said plug having an aperture therethrough for receipt of said splice pin when said splice pin is positioned in said slots, and shock absorbing means positioned in the interior barrel of said sleeve at least in the lower portion thereof such that the lower end of said cylindrical plug rests upon said shock absorbing means when said splice pin is positioned in said slots, and means for retaining said shock absorbing means within the interior barrel of said sleeve.

2. The drive core according to claim 1, wherein said shock absorbing means is positioned in the upper portion of the interior barrel of said sleeve contiguous with the upper end of said cylindrical plug when said splice pin is positioned within said slot, and wherein second retaining means is provided for retaining said shock absorbing means within the upper portion of the interior barrel of said sleeve.

3. The drive core according to claim 1, wherein said shock absorbing means comprises a plurality of rubber pads.

4. The drive core according to claim 1, wherein said shock absorbing means comprises a plurality of rubber impregnated fabric pads.

5. The drive core according to claim 1, wherein said retaining means for said lower shock absorbing means comprises a plate secured to the interior barrel of said sleeve.

6. The drive core according to claim 1, wherein said shock absorbing means comprise a reservoir of hydraulic fluid and said cylindrical plug comprises a piston within said reservoir which displaces the hydraulic fluid from one end thereof to the other.

7. The drive core according to claim 6, wherein said piston is provided with at least one longitudinal extending internal port, each end of said port communicating with the hydraulic fluid in said reservoir.

8. The drive core according to claim 6, wherein said piston is provided with at least one longitudinal extending port in the periphery thereof, each end of said port communicating with the hydraulic fluid in said reservoir.

9. The drive core according to claim 1, wherein said shock absorbing means comprises a spring.

10. The drive core according to claim 1, wherein said shock absorbing means in the lower portion of the interior of said sleeve is of a thickness such that said pin is positioned substantially centrally in said slot when said drive core is in a non-load transmitting fit.

References Cited

UNITED STATES PATENTS 3,178,893   4/1965   Fiore _____ 61—53
3,482,409   12/1969  Clements _____ 61—53.7 X JACOB SHAPIRO, Primary Examiner U.S. Cl. X.R.
61—53, 53.5